(12) United States Patent
Puckett et al.

(10) Patent No.: US 6,885,741 B1
(45) Date of Patent: Apr. 26, 2005

(54) SYSTEM AND METHOD FOR ON-HOLD CALL BACK

(75) Inventors: Christopher Alan Puckett, Greenville, SC (US); David A. Scott, Norcross, GA (US); Stephen R. Lapierre, Union City, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 635 days.

(21) Appl. No.: 09/717,701

(22) Filed: Nov. 21, 2000

(51) Int. Cl.[7] ............................................... H04M 3/42
(52) U.S. Cl. ........................... 379/210.01; 379/209.01; 709/202
(58) Field of Search ........................... 379/209.01, 67.1, 379/224, 142, 88.19, 88.25, 210.01; 709/202

(56) References Cited

U.S. PATENT DOCUMENTS

| | | | | |
|---|---|---|---|---|
| 5,436,967 A | * | 7/1995 | Hanson | 379/210.01 |
| 5,557,658 A | * | 9/1996 | Gregorek et al. | 379/88.25 |
| 5,600,710 A | * | 2/1997 | Weisser et al. | 379/88.19 |
| 5,661,790 A | * | 8/1997 | Hsu | 379/209.01 |
| 5,692,033 A | * | 11/1997 | Farris | 379/67.1 |
| 5,701,301 A | | 12/1997 | Weisser, Jr. | 370/428 |
| 6,363,411 B1 | * | 3/2002 | Dugan et al. | 709/202 |
| 6,574,324 B1 | * | 6/2003 | Malik | 379/210.01 |
| 2003/0016801 A1 | * | 1/2003 | Moss et al. | 379/142.01 |

* cited by examiner

Primary Examiner—Fan Tsang
Assistant Examiner—Md. Shafied Alam Elahee
(74) Attorney, Agent, or Firm—Woodcock Washburn LLP

(57) ABSTRACT

A method and system are disclosed for automated call back of a first telephone station that has been placed on hold by a second telephone station in an advanced intelligent network. The system comprises a service switching point connected to the first telephone station, a service node adapted to connect the second telephone station with the first telephone station when the second telephone station becomes available, and a service control point containing a database identifying the service node as adapted to connect the second and first telephone stations. The method includes the following steps: at the service switching point forwarding a request to the service control point to identify one of the plurality of service nodes to handle an automated call back from the second station to the first station; searching the database at the service control point for one of the plurality of service nodes to handle the automated call back to the first station from the second station; identifying to the service switching point, one of the plurality of service nodes to handle the automated call back from the second station to the first station; forwarding to the service node a request for automated call back from the second station to the first station; and upon receiving a signal from the second station at the service node, connecting the second station and the first station.

22 Claims, 4 Drawing Sheets

SYSTEM AND METHOD FOR ON-HOLD CALL BACK

FIELD OF THE INVENTION

The present invention generally relates to the field of telecommunications and to an apparatus and method for managing telephony-based services. More particularly, the present invention relates to an intelligent or advanced application, such as an Advanced Intelligent Network (AIN) application, for automated on-hold call back within a telephone network.

BACKGROUND OF THE INVENTION

In conventional telephone networks, often one party to a telephone connection is placed on hold by a second party. In such cases, the party that has been placed on hold is required to stay on the line and wait to be serviced. While holding on the line, the party is not available to apply themselves to other activities but rather must remain attentive to the phone line in case the call is taken off of hold. Thus, during the period that a party is on-hold, he/she is often underutilized and certainly is not entirely free to involve themselves in other activities.

In recent years, a number of new telephone service features have been provided by an AIN. The AIN evolved out of a need to increase the capabilities of the telephone network architecture in order to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network.

While prior telephone systems have addressed numerous shortcomings in the art, they have failed to address the requirement that a party, who has been placed on hold, must stay on the line and wait to be serviced. It would be highly desirable if the party that has been placed on hold could hang up and automatically be notified when the other party becomes available. The present invention is directed to such a solution.

SUMMARY OF THE PRESENT INVENTION

According to an aspect of the invention, there is provided a system for automated on-hold call back within a telephone network. The system provides that when a first telephone station is placed on hold by a second telephone station, the operator of the first station may hang up and will be automatically notified when the operator of the second telephone station becomes available. The system includes a service switching point communicating with at least the first telephone station, a service node communicating with the service switching point, and a service control point which contains a database. The service node is adapted to connect the second telephone station with the first telephone station when the operator of the second telephone station becomes available. The service control point database identifies that the service node is adapted to connect the first and second telephone stations.

In accordance with another aspect of the invention, there is provided a method of automated call back from a second telephone station to a first telephone station in an advanced intelligent network comprising the following components: a service switching point connected to the first station; a plurality of service nodes each having an interactive data system; and a service control point containing a database. The method includes the following steps: at the service switching point forwarding a request to the service control point to identify one of the plurality of service nodes to handle an automated call back from the second station to the first station; searching the database at the service control point for one of the plurality of service nodes to handle the automated call back to the first station from the second station; identifying to the service switching point, one of the plurality of service nodes to handle the automated call back from the second station to the first station; forwarding to the service node a request for automated call back from the second station to the first station; and upon receiving a signal from the second station at the service node, connecting the second station and the first station.

According to yet another aspect of the invention, there is provided a method of on-hold call back in a telephone network, comprising the following steps: receiving a request for on-hold call back wherein the request identifies a first telephone station and a second telephone station; at a service node, calling the first telephone station and indicating to a first telephone station operator that the on-hold call back has been initiated and directing the first telephone station operator to hang up; at a service node, broadcasting a message to the second telephone station indicating to a second telephone station operator that the first telephone station has requested a call back; at the service node, upon receipt of a signal from the second telephone station indicating that the second telephone station operator is available, calling the first telephone station to notify the first telephone station operator that the second telephone station operator is available; if the first telephone station operator is available, connecting the first telephone station and the second telephone station.

The above-listed features of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

According to an aspect of the present invention, an apparatus and method for on-hold call back may be implemented using an AIN or AIN-type network. AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Figure 1:
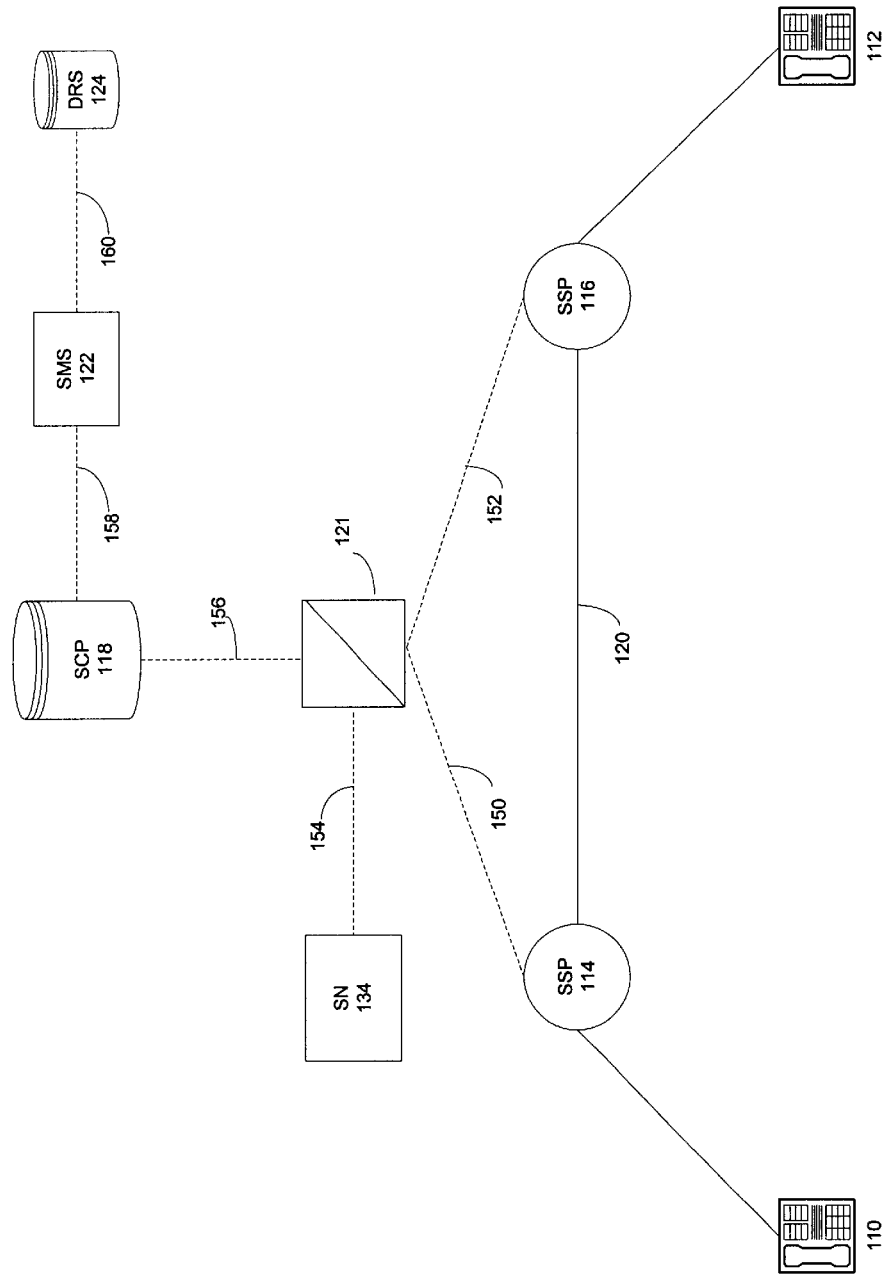
FIG. 1 illustrates, in a general block diagram form, an Advanced Intelligent Network (AIN)-based system for implementing intelligent network management features, in accordance with an embodiment of the present invention.

Referring now to the accompanying drawings, FIG. 1 illustrates a simplified AIN-based network arrangement incorporating the various features of the invention, as further described below. In the embodiment of FIG. 1, the system includes a first telephone station which for illustrative purposes will be referred to as subscriber station 110 and a second telephone station referred to as third party station 112. Stations 110 and 112 have corresponding switches, e.g., service switching points (SSP) (also known as central offices (CO)) 114 and 116. The COs 114 and 116 may comprise, for example, 1AESS or 5ESS switches. These switches may be manufactured by, for example, Lucent Technologies, Inc. or Nortel.

In the example shown in FIG. 1, each switch may include different types of facilities and/or triggers. SSPs 114 and 116 are each programmable switches which perform the following functions: recognize AIN-type calls, launch queries to service control point (SCP) 118, and receive commands and data from SCP 118 to further process and route AIN-type calls. When one of SSPs 114, 116 is triggered by an AIN-type call, the triggered SSP formulates an AIN service request and responds to call processing instructions from the network element in which the AIN service logic resides. According to an aspect of the invention, the AIN service logic may reside in a database at SCP 118.

As further shown in FIG. 1, SSP 114 is connected to SSP 116 over trunk 120. Trunk 120 may be either a SS7 controlled inter-machine trunk (IMT), or primary rate interface (PRI) trunk and the type of trunk will be in accordance with both the sending and receiving SSP to which it is connected. If either of SSPs 114, 116 is a 1AESS type switch, the trunk will be an SS7 controlled IMT type trunk as the 1AESS is not capable of supporting PRI trunks. However, if both the sending and receiving switches are either a DMS-100 switch or a 5ESS switch, the trunk may be either an SS7 controlled IMT type trunk or PRI type trunk.

AIN SSPs 114 and 116 may allow normal switch processing to be suspended at specific points in a call so that the switch may send an AIN message query via signaling transfer point (STP) 120 to SCP 118. SCP 118 may execute software based service logic and return call-processing instructions to the triggering AIN SSP. New services may be provisioned by assigning AIN SSP triggers to customer lines, trunks, and/or NANP telephone numbers.

SCP 118 may comprise an integrated service control point (ISCP). The ISCP is an integrated system that may include a service management system (SMS 122), a data and reports system (DRS) 124, a programmable service control point (SCP) (not shown), and a service creation environment (SCE) (not shown). The SCE may be provisioned as a terminal implemented to work with SMS to create, modify, and load services into the SCP database. The SCE may comprise, for example, a programming environment (such as SPACEK) for creating and provisioning services. SCP 118 may execute software-based service logic and return call routing instructions to triggering SSPs 114 and 116. SMS 130 may be provided for administrative purposes to synchronize customer CPR and data on the mated pair of ISCPs that SCP 118 represents. DRS 124 may be provided for compiling call information to be used for billing and administrative purposes.

The system of FIG. 1 further comprises service node (SN) 134. SN 134 is an interactive data system that acts as a switch to transfer calls. SN 134 provides interactive help, collects voice information from participants in a call, and provides notification functions. SN 134 may be a Lucent Technologies Star Server FT Model 3200 or Model 3300, although others may be employed without departing from the scope of the invention.

In order to facilitate signaling and data messaging, each SSP 114 and 116 is equipped with Common Channel Signaling (CCS) capabilities, e.g., SS7, which provides two-way communications of data messages over CCS links 150, 152, 154, 156, 158, and '160 between components of the AIN network. The data messages may be formatted in accordance with the Transaction Capabilities Applications Part (TCAP). Alternatively, ISDN Users Part (ISUP) may be used for signaling purposes between, for example, SSPs 114 and 116. In such a case, SSPs 114 and 116 may be equipped with the capability to map appropriate data between TCAP and ISUP protocols, and vice versa. The telephone network essentially employs an upper-level software controlled network through the STPs and the SCP (and/or ISCP). The software presides over the hardware to check the call route and the availability of connection prior to hardware connection.

Accordingly, the connections by links 150, 152, 154, 156, 158, and 160 are for signaling purposes and allow SSPs 114 and 116 to send and receive messages to and from SCP 118 and SN 134 via STP 120. For purposes of illustration, various features of the present invention will now be described from the standpoint of a switch implementing AIN protocols, and the CPR provisioned with TAT, 10D or DLN triggers. However, one skilled in the art will recognize that the above-described network is a simplified network meant for explanatory purposes. It is likely that a telephone network may comprise numerous user stations, SSPS, STPs, SCPs, and SNs along with other telephone network elements.

According to one aspect of the invention, a system for providing an on-hold call back service within the AIN or AIN-type environment is provided. Requests for on-hold call back are serviced by the AIN telephone network such that a party to a telephone connection that has been placed on hold can hang-up and be notified when the other party becomes available to take the call. For example, if subscriber station 110 is placed on hold by third party station 112, the operator of subscriber station 110 may hang-up and SSP 114 cooperates with SCP 118 and SN 134 to notify subscriber station 110 when the operator of third party station 112 becomes available.

Figure 2A:
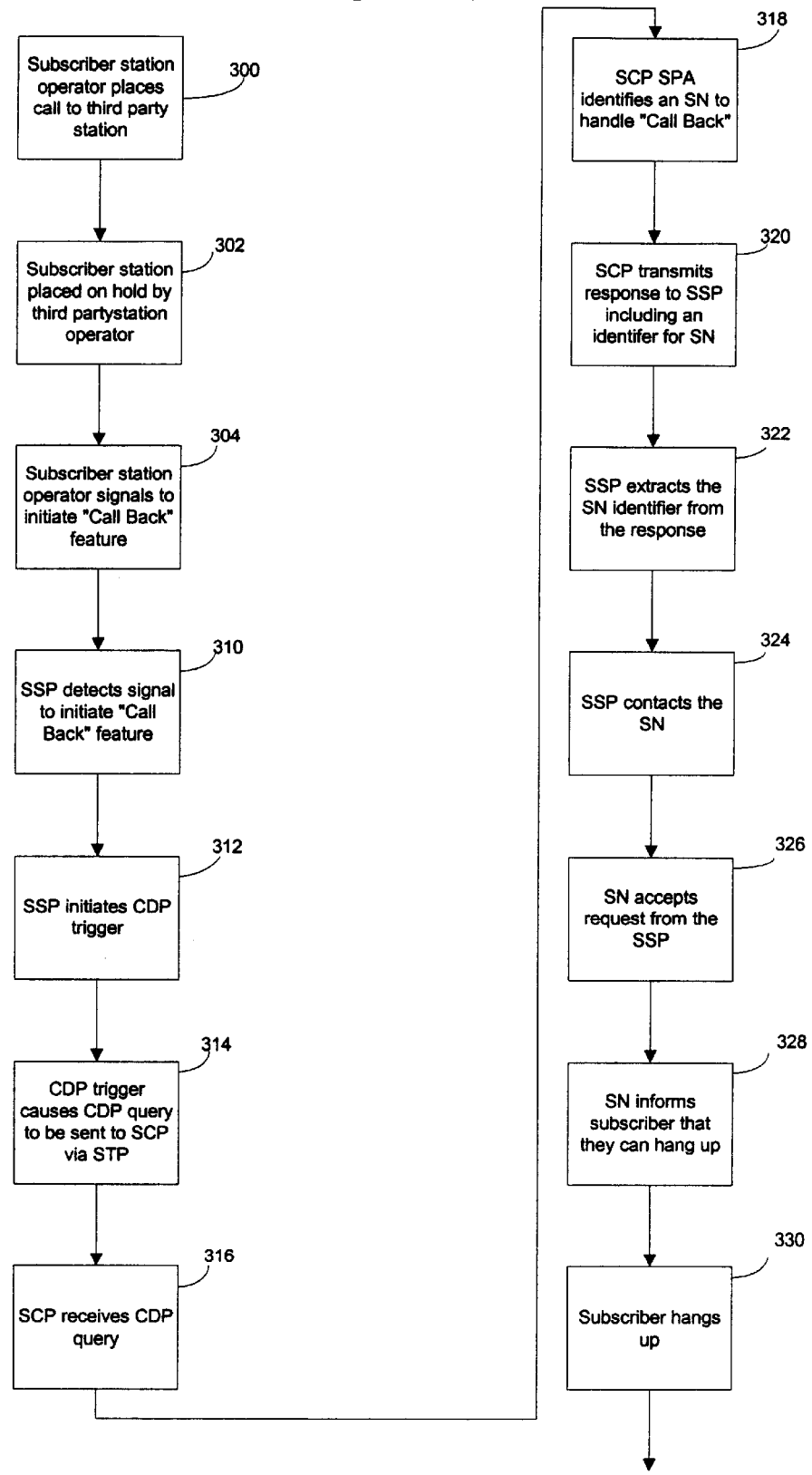
FIGS. 2A–B illustrate an exemplary flow diagram of call processing, according to an aspect of the present invention.
Figure 2B:
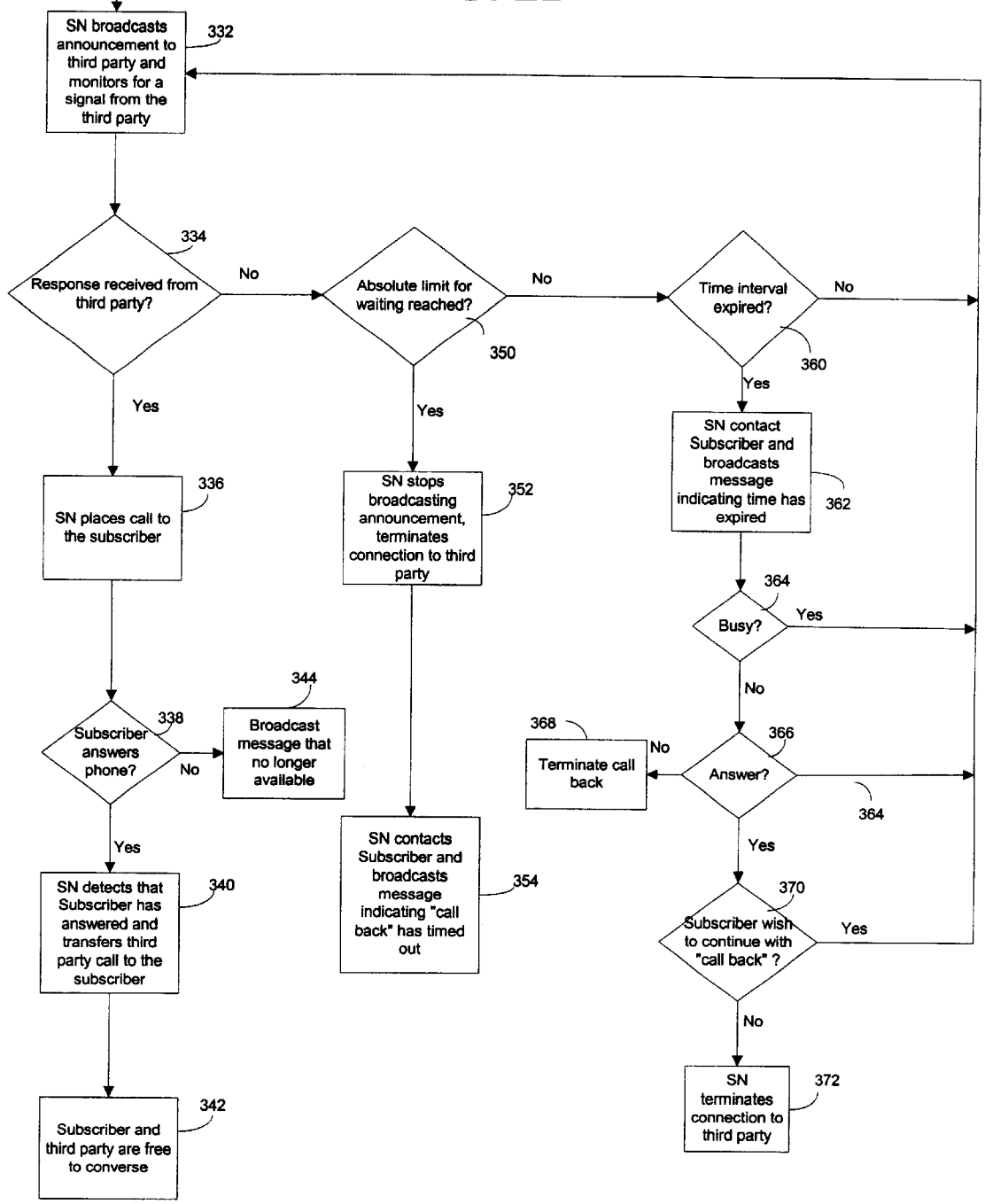

Referring now to the FIGS. 2A and 2B, there is illustrated an exemplary overview of the call flow logic according to an aspect of the present invention. The call flow for the on-hold call back service begins when, at step 300, an operator at subscriber station 110 places a call to third party station 112. The call is routed over the telephone network via normal procedures. At step 302, the call from subscriber station 110 is placed on hold by the operator of third party station 112. The operator of subscriber station 110, having been placed on hold, invokes the on-hold call back service at step 304. The on-hold call back feature may be invoked, for example, by flashing the switch hook at subscriber station 110, which has the effect to place third party station 112 on hold. Thereafter, the operator of the subscriber station 110 may enter a feature code such as, for example, *99 to signal that the on-hold call back service is being requested.

It is also a feature of the present invention that the party which requests the on-hold call back service, may also request that during the period which they are on-hold waiting for the other party, they be periodically polled as to whether they wish to continue waiting on-hold. Thus, the operator of subscriber station 110 may also request that the system periodically poll the operator as to whether to continue waiting for third party station 112 to respond. Typically this request is made in response to prompts from the system. Generally, the frequency of the polling is specified by the telephone company. For example, a telephone company may specify that polling occurs every 15 minutes for a maximum of one hour.

At step 310, SSP 114 detects the request for the on-hold call back service. In response to the request, at step 312, SSP 114 initiates a customized dialing plan (CDP) trigger associated with the on-hold call back feature. At step 314, the CDP trigger causes a TCAP message to be routed to SCP 118 via STP 120 wherein the message includes a CDP query to be processed by SCP 118. The CDP query is directed to identifying a service node (SN) to handle the on-hold call back request. In one embodiment, the selection of an SN to handle the request is determined by the telephone station from which the call back is to be made. In the present example, the on-hold call back is to be placed from third party station 112. Accordingly, the CDP query contains information identifying third party station 112.

At step 316, SCP 118 receives the CDP query and at step 318, SCP 118 responds to the query by launching a logic program which is referred to herein as a service package application (SPA). The SPA queries a database located at SCP 118 using the information contained in the CDP query. Specifically, the application uses the information identifying the third party station 112 to resolve which service node will handle the on-hold call back. In the present example, the database at SCP 118 designates SN 134 as responsible for handling on-hold call back from third party station 112. Typically, SN 134 is identified by a unique identifier such as a directory number (DN). The DN identifies a multi-line hunt group which connects SSP 110 to SN 134. The DN is stored as a 10 digit telephone number in the SCP 118 database. At step 320, SCP 118 transmits a TCAP message comprising instructions for handling the on-hold call back request to SSP 110. The instructions include a DN identifying SN 134 as being operable for handling the call-back feature.

At step 322, SSP 110 extracts the service node identifier, i.e. DN, from the instructions and at step 324 places a call to SN 134. At step 326, SN 134 accepts the call from SSP 110. This has the effect of placing SN 134 in communication with subscriber station 110. At step 328, SN 134 broadcasts a message that the on-hold call back is being implemented to subscriber station 110 and directs the operator of subscriber station 110 to hang up. In response, at step 330, the subscriber station operator hangs up.

At step 332, SN 134 broadcasts an announcement to third party station 112 indicating that subscriber station 110 called and requested that the operator of the third party station 112 call back. The announcement further provides direction as to how to implement the call back. For example, the announcement may direct an operator of the third party station to "press any key to notify the caller that you are now ready to speak with them." While broadcasting this message to third party station 112, SN 134 simultaneously listens for input from third party station 112 identifying that the third party station operator has become available.

If at step 334, a response is received at SN 134 from third party station 112, at step 336 SN 134 places a call to subscriber station 110. If at step 338, the call is answered at subscriber station 110, at step 340 SN 134 detects that the call has been answered and transfers the third party call to subscriber station 110. Thereafter, at step 342, the operators of subscriber station 110 and third party station 112 are free to converse. Of course, if at step 338, the call is not answered, at step 344 SN 134 broadcasts a message to third party station 112 indicating that the operator of subscriber station 110 is no longer available.

It should be noted that according to one aspect of the invention, it is a feature of the system that a time limit be set beyond which SN 134 will discontinue broadcasting a message to third party station 112. If no response is received within the prescribed time period, the callback will be canceled. Thus, if at step 334, no response has been received in the time interval, at step 350, SN 134 determines whether the predetermined maximum time period has been exceeded. If, at step 350, the time limit has been exceeded, at step 352, SN 134 discontinues broadcasting the announcement to third party station 112 and terminates the connection to third party station 112. At step 354, SN 134 places a call to subscriber station 120 and broadcasts a message indicating that the requested call back has timed out.

As noted above with reference to step 302, it is also a feature of the system that when the on-hold call back feature is requested, the operator may request that the system periodically check with the requester as to whether he/she wishes to continue waiting for the call back. In an exemplary embodiment, the requester may be polled, for example, every 15 minutes. Thus, if at step 350, the maximum waiting period has not been exceeded, at step 360, SN 134 determines whether the time interval for periodic polling of the subscriber has expired. If so, at step 362, SN 134 places a call to subscriber station 110 and broadcasts a message indicating that the periodic interval has expired and requests input as to whether to continue to hold. If at step 364, the line to subscriber station 110 is busy, it is assumed that the subscriber wishes to continue with the on-hold call back and flow continues at step 332. If the line is not busy, and at step 366 the subscriber does not answer, at step 368, SN 134 terminates the call-back feature. If the subscriber does answer, and at step 370 SN 134 receives an input from the subscriber station indicating the operator of subscriber station 110 desires to continue on hold, SN 134 continues to =broadcast the announcement to third party station 112. If however, at step 370, SN 134 receives an input indicating a desire to discontinue the on-hold call back, at step 372, SN 134 terminates the connection to third party station 112.

Figure 3:
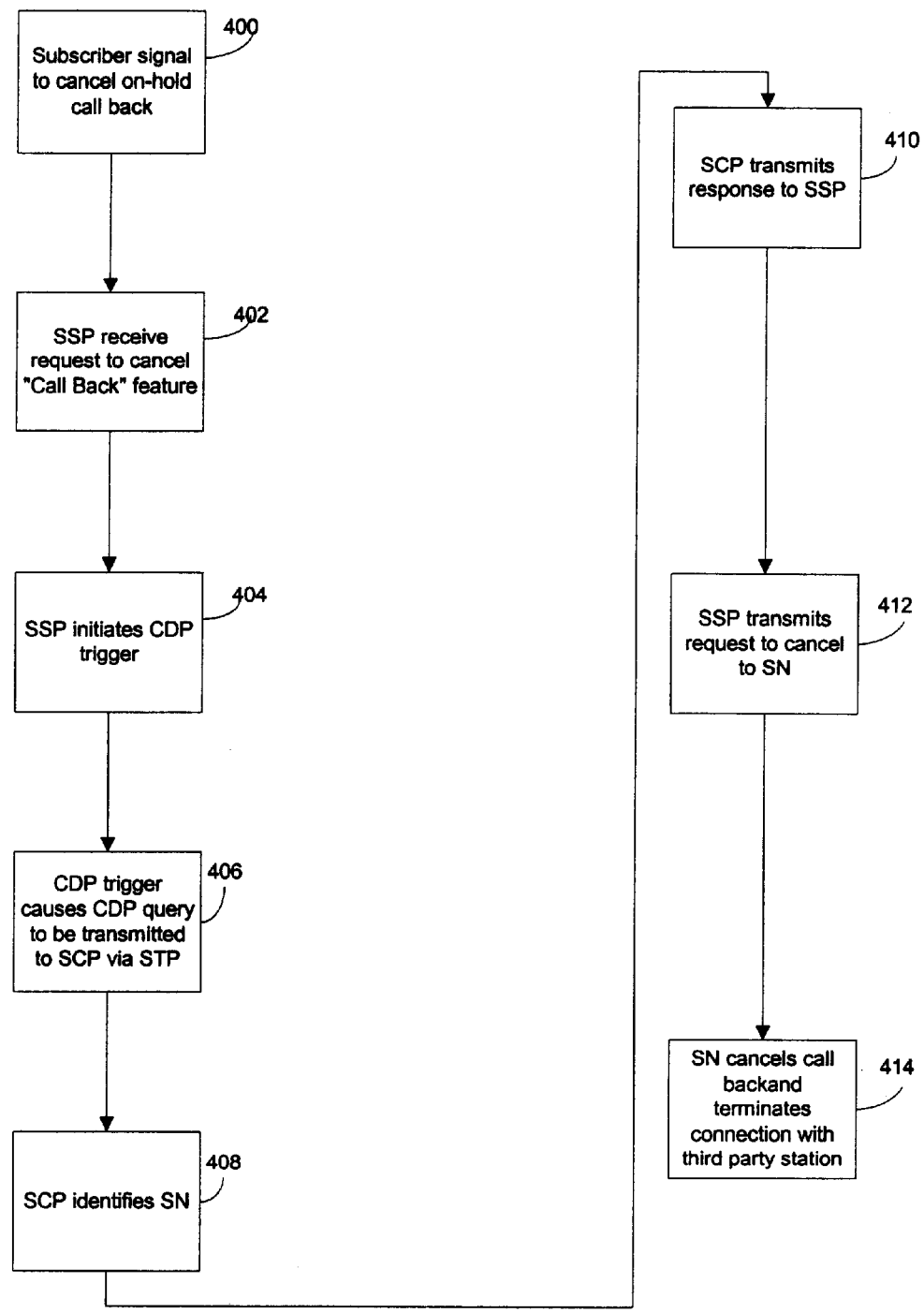
FIG. 3 illustrates an exemplary flow diagram of call processing, according to another aspect of the present invention.

According to still another feature of the present invention, a subscriber who has requested to implement the on-hold call back feature might also cancel the request. For example, the operator of subscriber station 110 may have been placed on-hold by third party station 112 and requested to be called back. However, before the call back is implemented, the operator of subscriber station 110 may decide to cancel the request. FIG. 3 depicts the call flow logic for the cancellation procedure. At step 400, the operator of subscriber station 110 signals to cancel a previously requested on-hold call back. The operator may signal to cancel the feature by pressing a predefined combination of keys at subscriber station 110. For example, the operator may signal by pressing *89.

At step 402, SSP 114 receives the request to cancel the call back and at step 404 SSP 114 initiates a CDP trigger corresponding to a request to cancel on-hold call back. At step 406 the CDP trigger causes a query to be transmitted to SCP 118. The query includes information identifying that the call back is to take place from third party station 112. In response to the query, at step 408 SCP 118 launches a logic application that queries the database to identify the SN designated to handle call backs from third party station 112. Of course, in the present illustrative example, SN 134 handles callbacks from third party station 112 and is therefore identified in the database. Thereafter, at step 410, SCP 118 transmits a response to SSP 110 wherein the response identifies SN 132. At step 412, SSP 110 transmits a request to SN 134 to cancel the call back from third party station 112 to subscriber station 110. The request identifies subscriber station 110 and third party station 112. At step 414, SN 134 terminates the connection with third party station 112.

As described above, the present invention provides a system for on-hold call-back. The system allows persons that have been placed on hold to hang up and be notified when the other party becomes available. Thus, the system frees persons from having to remain on the phone line waiting for the party that placed them on hold. Users of a system in accordance with the invention, therefore, can apply themselves to other activities while the system remains attentive to when the second party becomes available. In this way, a system in accordance with the present invention provides the potential to increase worker productivity.

It is noted that the written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
CCIS—Common Channel Interoffice Signaling
CCS—Common Channel Signaling
CO—Central Office
CPR—Call Processing Record
CPN—Calling Party Number
DLN—Dialed Line Number
DRS—Data and Reports System
EO—End Office
IMT—Inter-machine Trunk
ISCP—Integrated Service Control Point
ISUP—ISDN Users Part
LATA—Local Access and Transport Area
NANP—North American Numbering Plan
NPA—Numbering Plan Area
NXX—Central Office Code
PRI—Primary Rate Interface
PSTN—Public Switched Telephone Network
SCE—Service Creation Environment
SCP—Service Control PointSMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for call back of a first telephone station when placed on hold by a second telephone station, comprising:

a service switching point in communication with the first telephone station; said service switching point adapted to receive requests to perform on-hold call back;

a service node communicating with the service switching point, said service node adapted to connect the second telephone station with the first telephone station when the second telephone station becomes available; and a service control point communicating with said service switching point, and containing a database identifying said service node as adapted to connect the second telephone station with the first telephone station;

wherein said service switching point upon receipt of a request from the first telephone station to implement call back from the second telephone station, queries said service control point to identify said service node as adapted to connect the second telephone station with the first telephone station, and communicates to said service node to execute a call back from said second telephone station to said first telephone station, and wherein said service node, upon receipt of a request from said service switching point, communicates a message to hang up to the first telephone station, communicates a message to said second telephone station that the first telephone station wishes to be contacted, receives a signal indicating the second telephone station is available, communicates to the first telephone station that the second telephone station is available, and connects the second telephone station and first telephone station.

2. The system of claim 1, wherein said service control point, upon receipt of a request from said service switching point, queries said database and communicates to said service switching point that said service node is adapted to connect the second telephone station with the first telephone station when the second telephone station becomes available.

3. The system of claim 1, wherein said service switching point, in response to a request from the first telephone station to implement a call back from the second telephone station to the first telephone station, transmits a request to the service control point, said request to the service control point including information identifying at least the first telephone station and the second telephone station.

4. The system of claim 3, wherein said request from the first telephone station includes information identifying at least the first telephone station and the second telephone station.

5. The system of claim 3, wherein said service switching point launches a trigger application in response to the request from the first telephone station, said trigger application generating the request to the service control point.

6. The system of claim 3, wherein the request to the service control point from the service switching point comprises information identifying the second telephone station.

7. The system of claim 3, wherein said service control point, in response to the request from the service switching point, searches said database for information identifying said service node as adapted to connect the second telephone station with the first telephone station.

8. The system of claim 3, wherein said service control point launches a query application in response to the request from the service switching point, said query application searching said database for information identifying said service node as adapted to connect the second telephone station with the first telephone station.

9. The system of claim 3, wherein said service control point, in response to said request from the service switching point, communicates information identifying said service node to said service switching point, said service switching point communicating to said service node a request for implementing a call back from said second telephone station to said first telephone station.

10. In an advanced intelligent network comprising a service switching point connected to a first telephone station, a plurality of service nodes each having interactive data systems, a service control point containing a database, and a second telephone station, a method of automated call back from the second telephone station to the first telephone station, comprising:
   at the service switching point, forwarding a request to the service control point to identify one of the plurality of service nodes to handle the automated call back from the second telephone station to the first telephone station;
   searching the database at the service control point for one of the plurality of service nodes to handle the automated call back to the second telephone station;
   identifying to the service switching point, one of the plurality of service nodes to handle automated call back from the second telephone station to the subscriber;
   forwarding to the service node a request for automated call back from the second telephone station to the first telephone station;
   at the service node, transmitting a signal instructing the operator of the first telephone station to hang up;
   at the service node, transmitting a signal instructing an operator of the second telephone station to identify that they are available to communicate with the operator of the first telephone station;
   at the service node, detecting a signal indicating that the operator of the second telephone station is available to communicate with the operator of the first telephone station; and
   upon receiving a signal from the second telephone station at the service node, connecting the first telephone station and the second telephone station.

11. The method of claim 10, further comprising the act of receiving at the service switching point a request from the first telephone station for automated call back from the second telephone station to the first telephone station.

12. The method of claim 11, wherein the request from the first telephone station for automated call back from the second telephone station to the first telephone station comprises a flash switch hook signal.

13. The method of claim 10, further comprising, in response to the request from the first telephone station, the act of launching a trigger at the service switching point.

14. The method of claim 10, wherein the request to the service control point to identify one of the plurality of service nodes comprises information identifying the second telephone station.

15. The method of claim 10, wherein the request to the service control point to identify one of the plurality of service nodes comprises a customized dialing plan query.

16. The method of claim 10, wherein the database at the service control point comprises information identifying for the first telephone station a corresponding one of the plurality of service nodes.

17. The method of claim 10, wherein the act of identifying to the service switching point the one of the plurality of service nodes, comprises transmitting the directory number corresponding to the one of the plurality of service nodes.

18. The method of claim 17, wherein the act of forwarding to the service node a request for automated call back comprises calling the directory number.

19. The method of claim 10, further comprising repeating transmitting a signal instructing an operator of the second telephone station to identify that they are available to communicate with the operator of the first telephone station until a predetermined time limit is reached or until receiving a signal from the first telephone station canceling the automated call back from the second telephone station.

20. The method of claim 10, further comprising at the service node transmitting a signal to the first telephone station indicating that the operator of the second telephone station is available.

21. The method of claim 10, further comprising at the service node detecting a signal from the first telephone station indicating that the operator of the first telephone station is available.

22. A method of on-hold call back in a telephone network, comprising:
   receiving a request for on-hold call back, said request identifying a second telephone station and a first telephone station;
   at a service node, calling the first telephone station and indicating to a first telephone station operator that the on-hold call back has been initiated and directing the first telephone station operator to hang up;
   at a service node, broadcasting a message to the second telephone station indicating to an operator of the second telephone station that the first telephone station has requested a call back;
   at the service node, upon receipt of a signal from the second telephone station indicating that the operator of the second telephone station is available, calling the first telephone station to notify the first telephone station operator that the operator of the second telephone station is available; and
   if the first telephone station operator is available, connecting the first telephone station and the second telephone station.

* * * * *